United States Patent
Pelletti et al.

(10) Patent No.: US 11,217,902 B2
(45) Date of Patent: Jan. 4, 2022

(54) ANALOG BEAMFORMING ANTENNA FOR MILLIMETER WAVE APPLICATIONS

(71) Applicant: Metawave Corporation, Palo Alto, CA (US)

(72) Inventors: Chiara Pelletti, Palo Alto, CA (US); Maha Achour, Encinitas, CA (US)

(*) Notice: Subject to any disclaimer, the term of this patent is extended or adjusted under 35 U.S.C. 154(b) by 0 days.

(21) Appl. No.: 16/510,455

(22) Filed: Jul. 12, 2019

(65) Prior Publication Data

US 2020/0021039 A1    Jan. 16, 2020

Related U.S. Application Data

(60) Provisional application No. 62/697,879, filed on Jul. 13, 2018.

(51) Int. Cl.
    *H01Q 21/06*    (2006.01)
    *H01Q 21/00*    (2006.01)
    (Continued)

(52) U.S. Cl.
    CPC .......... *H01Q 21/064* (2013.01); *G01S 13/04* (2013.01); *G01S 13/931* (2013.01);
    (Continued)

(58) Field of Classification Search
    CPC .......... H01Q 1/38; H01Q 1/3233; H01Q 3/36; H01Q 21/0025; H01Q 21/064;
    (Continued)

(56) References Cited

U.S. PATENT DOCUMENTS 6,043,790 A    3/2000  Derneryd et al.
6,492,949 B1   12/2002 Breglia et al.
(Continued)

OTHER PUBLICATIONS

Moeini-Fard, Mojtaba et al., "Transmit Array Antenna Using Non-uniform Dielectric Layer", Advances in Wireless Communication and Networks, vol. 3, No. 3, 2017, pp. 23-28.
(Continued)

*Primary Examiner* — Tung X Le
(74) *Attorney, Agent, or Firm* — Sandra Lynn Godsey

(57) ABSTRACT

Examples disclosed herein relate to an analog beamforming antenna for millimeter wavelength applications. The analog beamforming antenna includes a superelement antenna array layer comprising an array of superelements, in which each superelement includes a coupling aperture oriented at a predetermined non-orthogonal angle relative to a plurality of radiating slots for radiating a transmission signal. The analog beamforming antenna also includes a power division layer configured to serve as a feed to the superelement antenna array layer, in which the power division layer comprising a plurality of phase control elements configured to apply different phase shifts to transmission signals propagating to the superelement antenna array layer. The analog beamforming antenna also includes a top layer disposed on the superelement antenna array layer. The top layer may include a superstrate or a metamaterial antenna array. Other examples disclosed herein include a radar system for use in an autonomous driving vehicle.

20 Claims, 15 Drawing Sheets

(51) Int. Cl.
H01Q 1/38 (2006.01)
G01S 13/931 (2020.01)
H01Q 1/32 (2006.01)
G01S 13/04 (2006.01)
H01Q 3/36 (2006.01)

(52) U.S. Cl.
CPC .............. *H01Q 1/3233* (2013.01); *H01Q 1/38* (2013.01); *H01Q 3/36* (2013.01); *H01Q 21/0025* (2013.01)

(58) Field of Classification Search
CPC .......... G01S 7/415; G01S 7/417; G01S 13/04; G01S 13/931; G01S 13/584
See application file for complete search history.

(56) References Cited

U.S. PATENT DOCUMENTS

| | | | |
|---|---|---|---|
| 6,768,453 | B2 | 7/2004 | Solbach |
| 8,754,810 | B2 | 6/2014 | Guo et al. |
| 10,381,741 | B2* | 8/2019 | Kirino ................ H01Q 21/005 |
| 2007/0093274 | A1* | 4/2007 | Jafarkhani ........... H04B 7/0626 455/562.1 |
| 2007/0263748 | A1* | 11/2007 | Mesecher ............ H01Q 3/2605 375/299 |
| 2010/0177012 | A1* | 7/2010 | Morrow ............ H01Q 21/0025 343/893 |
| 2011/0063170 | A1* | 3/2011 | Ookawa ................ G01S 7/2813 342/372 |
| 2013/0027240 | A1* | 1/2013 | Chowdhury .......... G01S 13/584 342/94 |
| 2017/0285158 | A1* | 10/2017 | Halbert ................ G01S 13/878 |
| 2018/0198204 | A1* | 7/2018 | Kovacic ................ H04W 52/32 |
| 2020/0403649 | A1* | 12/2020 | Alexanderson ......... H03F 3/245 |

OTHER PUBLICATIONS

Ala-Laurinaho, Juha et al., "2-D Beam-Steerable Integrated Lens Antenna System for 5G E-Band Access and Backhaul", IEEE Transactions on Microwave Theory and Techniques, vol. 64, No. 7, Jul. 2016, pp. 2244-2255.

Gu, Xiaoxiong et al., "A multilayer organic package with 64 dual-polarized antennas for 28GHz 5G communication," 2017 IEEE MTT-S International Microwave Symposium (IMS), 2017, pp. 1899-1901.

Ji, Lu-Yang et al., "A Reconfigurable Beam-Scanning Partially Reflective Surface (PRS) Antenna", 2015 9th European Conference on Antennas and Propagation (EuCAP), 2015, pp. 1-3.

Zhou, Haifeng et al., "Evolution of Satellite Communication Antennas on Mobile Ground Terminals", International Journal of Antennas and Propagation, vol. 2015, Article ID 436250, 14 pages, http://dx.doi.org/10.1155/2015/436250.

Tian, Wenming et al., "Analysis of the RCS and Radiation Pattern of a Planar Array Antenna Integrated with Dielectric and FSS", Progress in Electromagnetics Research Symposium Proceedings, Xi'an, China, Mar. 22-26, 2010, pp. 853-856.

Zhang, Miao et al., "Design of a Double-Layer Slotted Waveguide Array with a Partially Corporate Feed Circuit Installed in the Bottom Layer and its Fabrication by Diffusion Bonding of Laminated Thin Plates in 38GHz Band", IEICE Technical Report, Antennas and Propagation, vol. 109, 2009, pp. 373-376.

Guo, Y. Jay, et al., "Low-Cost Beamforming Employing Reconfigurable Antennas", 2014 International Workshop on Antenna Technology: Small Antennas, Novel EM Structures and Materials, and Applications (iWAT), 2014, pp. 155-158.

Ji, Lu-Yang et al., "Pattern Reconfigurable Fabry-Perot Cavity Antenna", 2015 International Symposium on Antennas and Propagation (ISAP), Nov. 2015, pp. 1-3.

Zhang, Jian A. et al., "Massive Hybrid Antenna Array for Millimeter-Wave Cellular Communication", IEEE Wireless Communications, Feb. 2015, pp. 79-87.

Boccia, Luigi et al., "Multilayer Antenna-Filter Antenna for Beam-Steering Transmit-Array Applications", IEEE Transactions On Microwave Theory and Techniques, vol. 60, No. 7, Jul. 2012, pp. 2287-2300.

Schoebel, Joerg et al., "Planar Antenna Technology, for mm-Wave Automotive Radar, Sensing, and Communications", Radar Technology, 2010, pp. 297-318.

Gupta, Shraman, "Analysis and Design of Substrate Integrated Waveguide-based Antennas for Millimeter Wave Applications", Thesis, Concordia University, Montreal, Quebec, Canada, May 2016.

Djerafi, Tarek et al., "Substrate Integrated Waveguide Antennas", Handbook of Antenna Technologies, Handbook of Antenna Technologies, 2015, pp. 1585-1655.

Abdelrahman, Ahmed H. et al., "Transmission Phase Limit of Multilayer Frequency-Selective Surfaces for Transmitarray Designs", IEEE Transactions on Antennas and Propagation, vol. 62, No. 2, Feb. 2014, pp. 690-697.

* cited by examiner

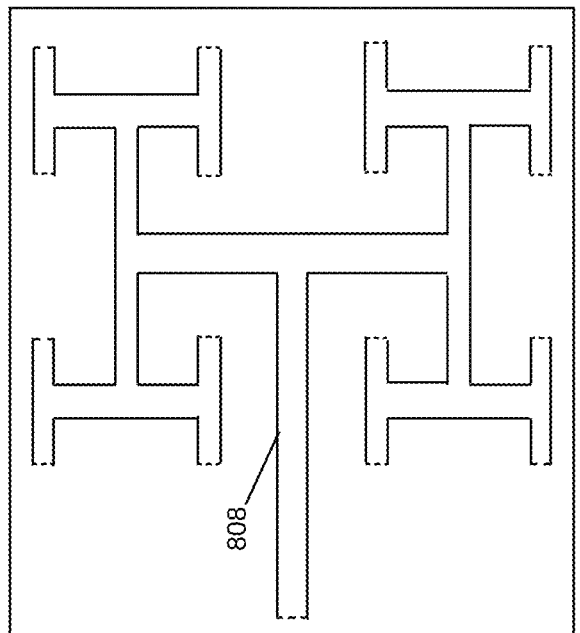
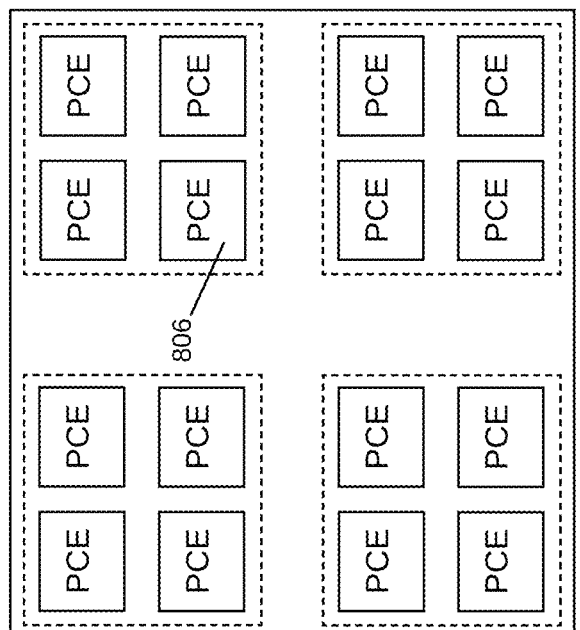
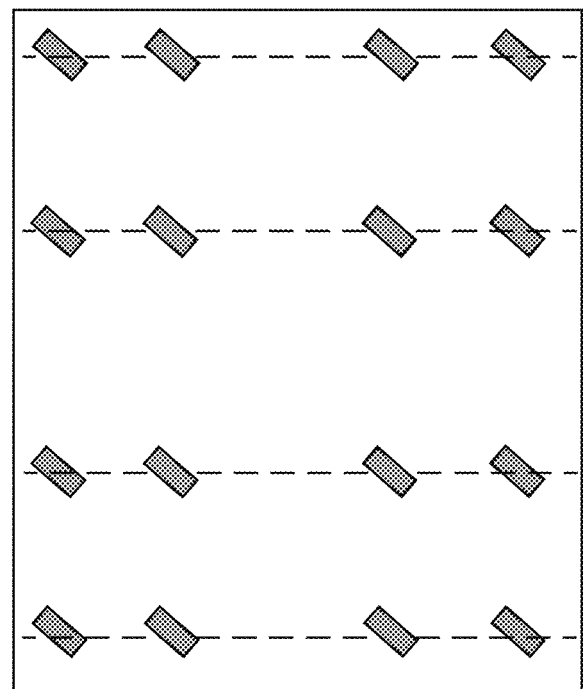
FIG. 8

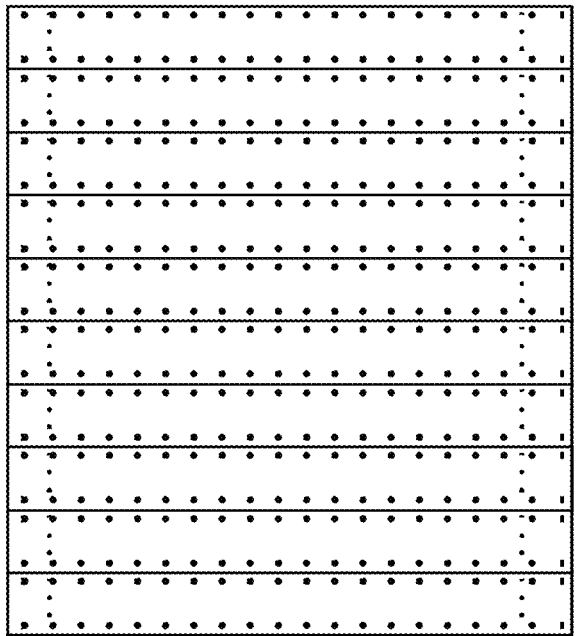
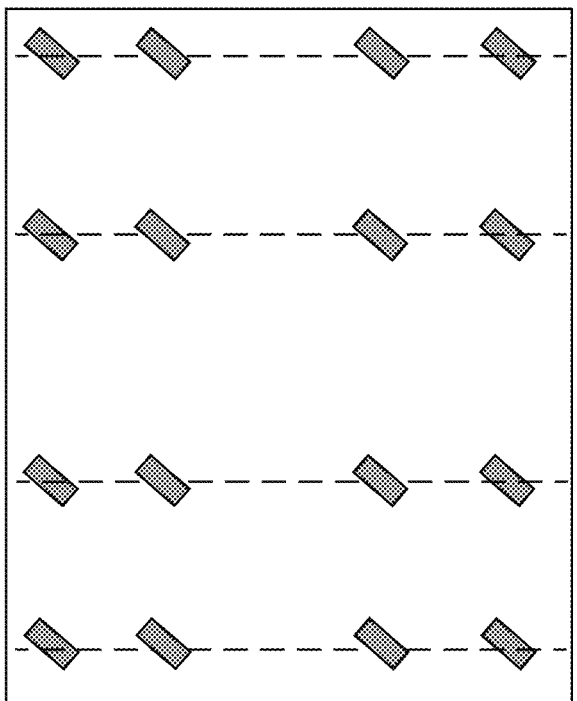
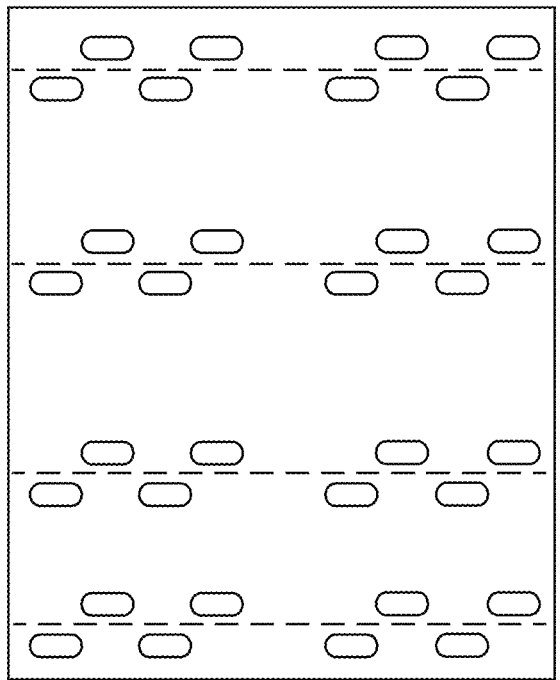
FIG. 13

ANALOG BEAMFORMING ANTENNA FOR MILLIMETER WAVE APPLICATIONS

CROSS-REFERENCE TO RELATED APPLICATIONS

This application claims priority from U.S. Provisional Application No. 62/697,879, titled "ANALOG BEAMFORMING ANTENNA FOR MILLIMETER WAVE APPLICATIONS," filed on Jul. 13, 2018, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 8 illustrates a schematic diagram illustrating the multiple layers in a power division layer in accordance with some implementations of the subject technology;

FIG. 13 illustrates a schematic diagram illustrating the multiple layers in a superelement antenna array layer in accordance with some implementations of the subject technology;

DETAILED DESCRIPTION

An analog beamforming antenna for millimeter wave ("mm-wave") applications is disclosed. The analog beamforming antenna is suitable for many different mm-wave applications and can be deployed in a variety of different environments and configurations. Mm-wave applications are those operating with frequencies between 30 and 300 GHz or a portion thereof, including autonomous driving applications in the 77 GHz range and 5G applications in the 60 GHz range, among others. In various examples, the analog beamforming antenna is incorporated in a radar in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on. The analog beamforming antenna enables a radar to be a "digital eye" with true 3D vision and human-like interpretation of the world.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
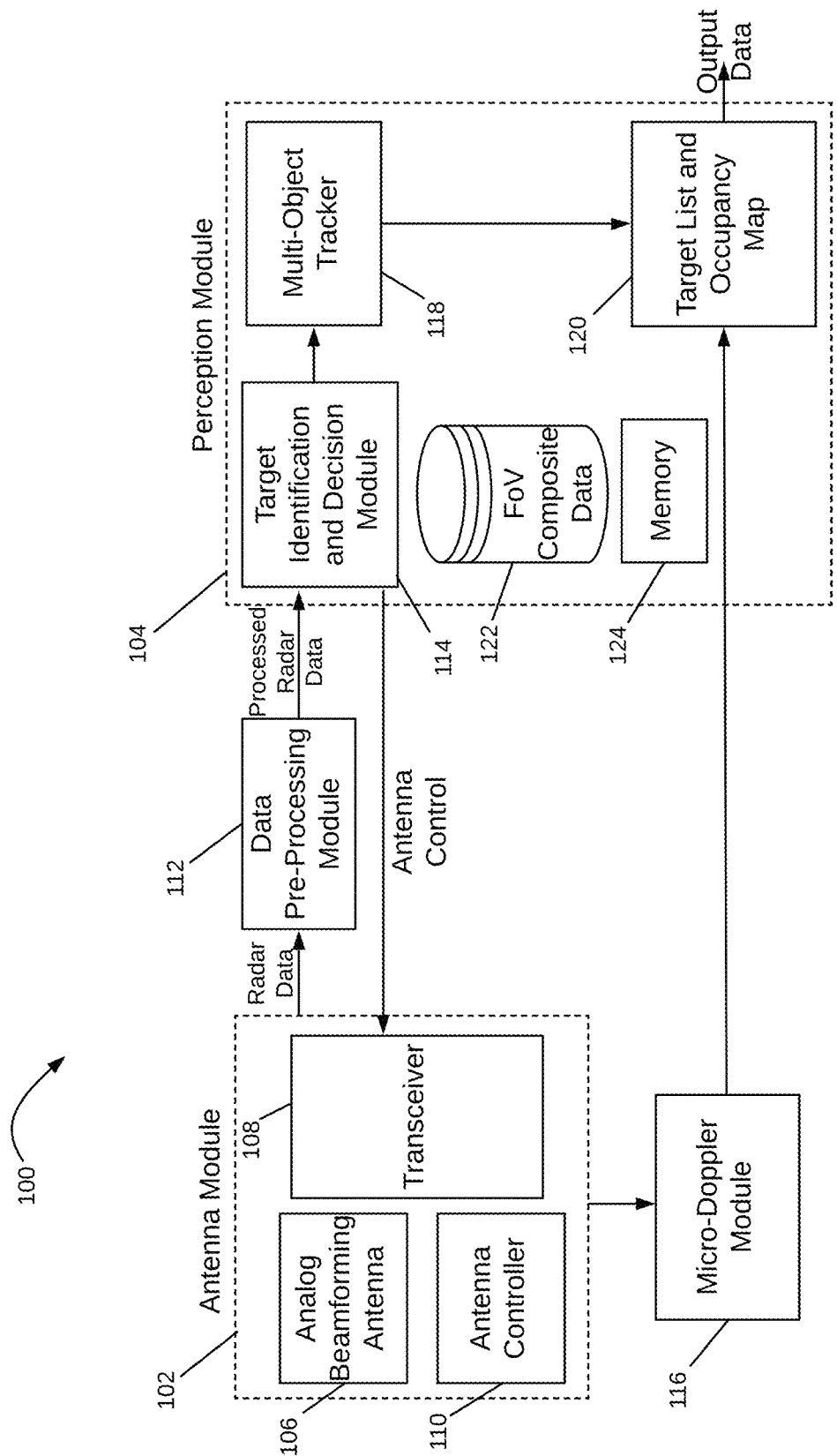
FIG. 1 illustrates a schematic diagram of a radar system for use in an autonomous driving system in accordance with some implementations of the subject technology.

FIG. 1 illustrates a schematic diagram of a radar system 100 in accordance with some implementations of the subject technology. The radar system 100 includes an antenna Module 102 and a perception Module 104. The radar system 100 is a "digital eye" with true 3D vision and capable of a human-like interpretation of the world. The "digital eye" and human-like interpretation capabilities are provided by the two main modules: the antenna module 102 and the perception module 104. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The antenna module 102 includes an analog beamforming antenna 106, a transceiver module 108 and an antenna controller 110. The analog beamforming antenna 106 can radiate dynamically controllable and highly-directive Radio Frequency (RF) beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 108 is coupled to the analog beamforming antenna 106, and prepares a signal for transmission, such as a signal for a radar device. In some aspects, the signal is defined by modulation and frequency. The signal is provided to the analog beamforming antenna 106 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 110, such as at the direction of perception module 104.

The RF beams reflect from targets in the ego vehicle's path and surrounding environment, and the RF reflections are received by the transceiver module 108. Radar data from the received RF beams is provided to the perception module 104 for target detection and identification. A super-resolution network 112 increases the resolution of the radar data prior to it being processed to detect and identify targets. For example, the super-resolution network 112 can process the radar data and determine high resolution radar data for use by the perception module 104. In various examples, the super-resolution network 112 can be a part of the perception module 104, such as on the same circuit board as the other modules within the perception module 104. Also, in various examples, the data encoding may use the lidar point cloud from the ego lidar to perform NLOS correction in the radar data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception module 104 controls further operation of the antenna module 102 by, for example, providing an antenna control signal containing beam parameters for the next RF beams to be radiated from unit cells in the analog beamforming antenna 106.

In operation, the antenna controller 110 is responsible for directing the analog beamforming antenna 106 to generate RF beams with determined parameters such as beam width, transmit angle, and so on. The antenna controller 110 may, for example, determine the parameters at the direction of perception module 104, which may at any given time determine to focus on a specific area of a Field-of-View (FoV) upon identifying targets of interest in the ego vehicle's path or surrounding environment. The antenna controller 110 determines the direction, power, and other parameters of the RF beams and controls the analog beamforming antenna 106 to achieve beam steering in various directions. The antenna controller 110 also determines a voltage matrix to apply to reactance control mechanisms coupled to the analog beamforming antenna 106 to achieve a given phase shift. In some examples, the analog beamforming antenna 106 is adapted to transmit a directional beam through active control of the reactance parameters of the individual unit cells that make up the analog beamforming antenna 106. The perception module 104 provides control actions to the antenna controller 110 at the direction of the Target Identification and Decision Module 114.

Next, the analog beamforming antenna 106 radiates RF beams having the determined parameters. The RF beams are reflected from targets in and around the ego vehicle's path (e.g., in a 360° field of view) and are received by the transceiver module 108 in antenna module 102. The antenna module 102 transmits the received 4D radar data to the super-resolution network 112 for increasing the resolution of the radar data, for which higher resolution radar data is then sent to the target identification and decision module 114 of the perception module 104. The use of the super-resolution network 112 also improves the training and performance of the target identification and decision module 114. A micro-doppler module 116 coupled to the antenna module 102 and the perception module 104 extracts micro-doppler signals from the 4D radar data to aid in the identification of targets by the perception module 104. The micro-doppler module 116 takes a series of RD maps from the antenna module 102 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the perception module 104 can determine the class of the target (i.e., whether a vehicle, pedestrian, cyclist, animal, etc.) with over 90% accuracy. Further, as this classification may be performed by a linear Support Vector Machine (SVM), it is extremely computationally efficient. In various examples, the micro-doppler module 116 can be a part of the antenna module 102 or the perception module 104, such as on the same circuit board as the other modules within the antenna module 102 or perception module 104.

The target identification and decision module 114 receives the higher resolution radar data from the super-resolution network 112, processes the data to detect and identify targets, and determines the control actions to be performed by the antenna module 102 based on the detection and identification of such targets. For example, the target identification and decision module 114 may detect a cyclist on the path of the ego vehicle and direct the antenna module 102, at the instruction of its antenna controller 110, to focus additional RF beams at a given phase shift and direction within the portion of the FoV corresponding to the cyclist's location.

The perception module 104 may also include a multi-object tracker 118 to track the identified targets over time, such as, for example, with the use of a Kalman filter. The multi-object tracker 118 matches candidate targets identified by the target identification and decision module 114 with targets it has detected in previous time windows. By combining information from previous measurements, expected measurement uncertainties, and some physical knowledge, the multi-object tracker 118 generates robust, accurate estimates of target locations.

Information on identified targets over time are then stored at a target list and occupancy map 120, which keeps track of targets' locations and their movement over time as determined by the multi-object tracker 118. The tracking information provided by the multi-object tracker 118 and the micro-doppler signal provided by the micro-doppler module 116 are combined at the target list and occupancy map 120 to produce an output containing the type/class of target identified, their location, their velocity, and so on. This information from radar system 100 is then sent to a sensor fusion module (not shown), where it is processed together with information from other sensors in the ego vehicle.

In various examples, the perception module 104 includes an FoV composite data unit 122, which stores information that describes an FoV. This information may be historical data used to track trends and anticipate behaviors and traffic conditions or may be instantaneous or real-time data that describes the FoV at a moment in time or over a window in time. The ability to store this data enables the perception module 104 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception module 104 may determine to narrow the beam width for a more focused view of that sector or area in the FoV. The next scan may indicate the targets' length or other dimension, and if the target is a vehicle, the perception module 104 may consider what direction the target is moving and focus the beams on that area. Similarly, the echo may be from a spurious target, such as a bird, which is small and moving quickly out of the path of the vehicle. There are a variety of other uses for the FoV composite data 122, including the ability to identify a specific type of target based on previous detection. The perception module 104 also includes a memory 124 that stores useful data for radar system 100, such as, for example, information on which subarrays of the analog beamforming antenna 106 perform better under different conditions.

In various examples described herein, the use of radar system 100 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 10 km/h when visibility is poor. Using the radar system 100, the driver (or driverless vehicle) may maintain the maximum safe speed without regard to the weather conditions. Even if other drivers slow down, a vehicle enabled with the radar system 100 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal so as to detect any echoes in time to react. In rural areas and other areas with few obstacles during travel, the perception module 104 adjusts the focus of the RF beam to a larger beam width, thereby enabling a faster scan of areas where there are few echoes. The perception module 104 may detect this situation by evaluating the number of echoes received within a given time period and making beam size adjustments accordingly. Once a target is detected, the perception module 104 determines how to adjust the beam focus. This is achieved by changing the specific configurations and conditions of the analog beamforming antenna 106. In one example scenario, the voltages on the reactance control mechanisms of the reactance control module of analog beamforming antenna 106 are adjusted. In another example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 100.

All of these detection scenarios, analysis and reactions may be stored in the perception module 104, such as in the memory 124, and used for later analysis or simplified reactions. For example, if there is an increase in the echoes received at a given time of day or on a specific highway, that information is fed into the antenna controller 110 to assist in proactive preparation and configuration of the analog beamforming antenna 106. Additionally, there may be some subarray combinations that perform better, such as to achieve a desired result, and this is stored in the memory 124.

Figure 2:
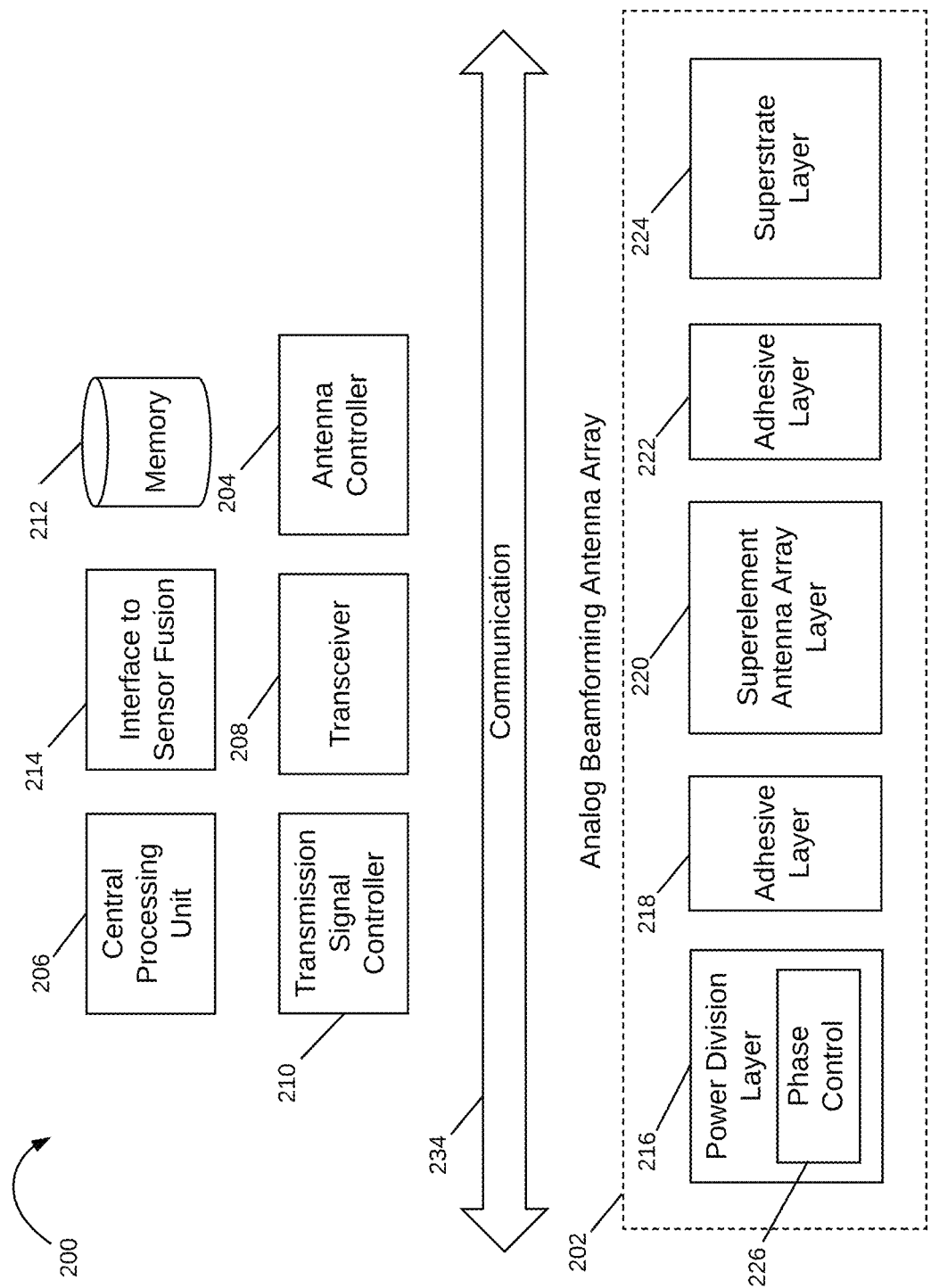
FIG. 2 illustrates a schematic diagram of an antenna module for use with the radar system of FIG. 1 in accordance with some implementations of the subject technology.

Attention is now directed to FIG. 2, which shows a schematic diagram of an antenna module 200 for use with the radar system 100 of FIG. 1 in accordance with some implementations of the subject technology. The antenna module 200 has an analog beamforming antenna array 202 coupled to an antenna controller 204, a central processor 206, and a transceiver 208. A transmission signal controller 210 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 210 may also generate a cellular modulated signal, such as an Orthogonal Frequency Division Multiplexed (OFDM) signal. In some examples, the signal is provided to the antenna module 200 and the transmission signal controller 210 may act as an interface, translator or modulation controller, or otherwise as required for the signal to propagate through a transmission line system. The received information is stored in a memory storage unit 212, wherein the information structure may be determined by the type or transmission and modulation pattern.

In various examples, the analog beamforming antenna array 202 radiates the transmission signal through a structure that includes three main layers: power division layer 216, superelement antenna array layer 220 and a superstrate layer 224, interspersed by two adhesive layers 218 and 222. The power division layer 216 is a corporate feed structure having a plurality of transmission lines for transmitting the signal to superelement subarrays in the superelement antenna array layer 220. Each superelement subarray in the superelement antenna array layer 220 includes a plurality of radiating slots for radiating the transmission signal into the air. The slots are configured in a specific pattern as described below, but other patterns, shapes, dimensions, orientations and specifications may be used to achieve a variety of radiation patterns. The power division layer 216 also includes a phase control layer 226 for applying different phase shifts in the radiated RF signals. The phase control layer 226 may include RF integrated circuits (RFICs) having a varactor, a network of varactors, or a phase shift network to achieve phase shifts in a range of 0° to 360° degrees and thereby enable full scanning of an entire FoV. The superstrate layer 224 is used to increase the efficiency and directivity of the analog beamforming antenna array 202, and the adhesive layers 218 and 222 are made of adhesive material to adhere the layers 216, 220 and 224 together. The adhesive layers 218 and 222 may be, for example, pre-impregnated ("prepreg") bonding sheets.

Although FIG. 2 depicts one analog beamforming antenna array 202 in the Antenna module 200, the antenna module 200 may have multiple MLMS antenna arrays in any given configuration depending on implementation. A set of analog beamforming antennas may be configured to serve as transmit antennas, and another set of analog beamforming antennas may be configured to serve as receive antennas. In one or more implementations, an MLMS antenna in the analog beamforming antenna array 202 may be orthogonal to another antenna in the analog beamforming antenna array 202. Different analog beamforming antennas may also have different polarizations. In various examples, different analog beamforming antennas may be configured to detect different targets, e.g., a first set of antennas may be configured to enhance the detection and identification of pedestrians, a second set of antennas may be configured to enhance the detection and identification of vehicles, and so forth. In the case of pedestrians, the configuration of the analog beamforming antennas may include power amplifiers to adjust the power of a transmitted signal and/or apply different polarization modes for different arrays to enhance pedestrian detection. It is appreciated that numerous configurations of analog beamforming antennas may be implemented in a given antenna module.

In operation, the antenna controller 204 receives information from other modules in the antenna module 200 and/or from the perception module 104 of FIG. 1 indicating a next radiation beam, in which a radiation beam may be specified by parameters such as beam width, transmit angle, transmit direction and so forth. The antenna controller 204 determines a voltage matrix to apply to reactance control mechanisms in the analog beamforming antenna array 202 to achieve a given phase shift or other antenna parameters.

Transceiver 208 prepares a signal for transmission, such as a signal for a radar device, wherein the signal is defined by modulation and frequency. The signal is received by the analog beamforming antenna array 202 and the desired phase of the radiated signal is adjusted at the direction of the antenna controller 204. In some examples, the analog beamforming antenna array 202 can be implemented in many applications, including radar, cellular antennas, and autonomous vehicles to detect and identify targets in the path of or surrounding the vehicle. Alternate examples may use the analog beamforming antenna for wireless communications, medical equipment, sensing, monitoring, and so forth. Each application type incorporates designs and configurations of the elements, structures and modules described herein to accommodate their needs and goals.

In the antenna module 200, a signal is specified by antenna controller 204, which may be at the direction of perception module (e.g., perception module 104 in FIG. 1), a sensor fusion module via interface-to-sensor fusion 214, or it may be based on program information from memory storage 212. There are a variety of considerations to determine the beam formation, wherein this information is provided to antenna controller 204 to configure the various elements of the analog beamforming antenna array 202, which are described herein. The transmission signal controller 210 generates the transmission signal and provides it to the analog beamforming antenna array 202, such as through a coaxial cable or other connector. The signal propagates through the power division layer 216 to the superelement antenna array layer 220 and superstrate layer 224 for transmission through the air.

The antenna structure of FIG. 2 may be referred to as a type of slotted wave guide antenna ("SWGA"), in which the power division layer 216 is configured to serve as a feed to the superelement antenna array layer 220. Alternate examples may reconfigure and/or modify the antenna structure to improve radiation patterns, bandwidth, side lobe levels, and so forth. The antenna performance may be adjusted by design of the antenna's features and materials, such as the shape of the slots, slot patterns, slot dimensions, conductive trace materials and patterns, as well as other modifications to achieve impedance matching and so forth.

Figure 3:
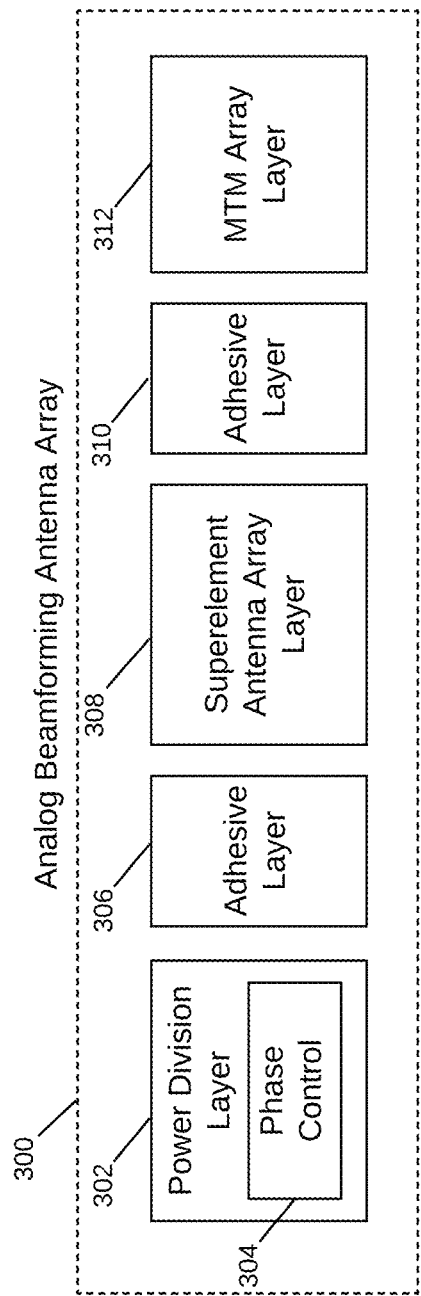
FIG. 3 illustrates another example of an analog beamforming antenna array for use in the antenna module of FIG. 2 in accordance with some implementations of the subject technology.

Attention is now directed to FIG. 3, which illustrates another example of an analog beamforming antenna array 300 for use in the antenna module 200 of FIG. 2. The analog beamforming antenna array 300 includes a power division layer 302 and a superelement antenna array layer 308, similar to layers 216 and 220 of FIG. 2, and interspersed by adhesive layers 306 and 310, similar to adhesive layers 218 and 222 of FIG. 2. However, the analog beamforming antenna array 300 includes a metamaterial (MTM) array layer 312 in lieu of the superstrate layer 224 of FIG. 2, in which phase control is provided within MTM cells in the MTM array layer 312. The power division layer 302 includes a phase control module 304. The analog beamforming antenna array 300 enables phase control through the phase control module 304 in the power division layer 302 as well as through phase control devices in each MTM cell of the MTM array layer 312.

The MTM array layer 312 is composed of individual MTM cells, where each of the MTM cells has a uniform size and shape; however, some examples may incorporate different sizes, shapes, configurations and array sizes. Each MTM cell may include a conductive outer portion or loop surrounding a conductive area with a space in between. Each cell may be configured on a dielectric layer, with the conductive areas and loops provided around and between different cells. A voltage controlled variable reactance device embedded on each MTM cell, e.g., a varactor, provides a controlled reactance between the conductive area and the conductive loop. The controlled reactance is controlled by an applied voltage, such as an applied reverse bias voltage in the case of a varactor. The change in reactance changes the behavior of the MTM cell, enabling the MTM array layer 312 to provide focused, high gain beams directed to a specific location.

As generally described herein, an MTM cell is an artificially structured element used to control and manipulate physical phenomena, such as the Electromagnetic (EM) properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible material, but rather is a geometric design of known materials, such as conductors, that behave in a specific way. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna or radar, as small changes to the MTM cell can result in large changes to the beamform.

The MTM cells include a variety of conductive structures and patterns, such that a received transmission signal is radiated therefrom. In various examples, each MTM cell has some unique properties. These properties may include a negative permittivity and permeability resulting in a negative refractive index; these structures are commonly referred to as left-handed materials (LHM). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 4:
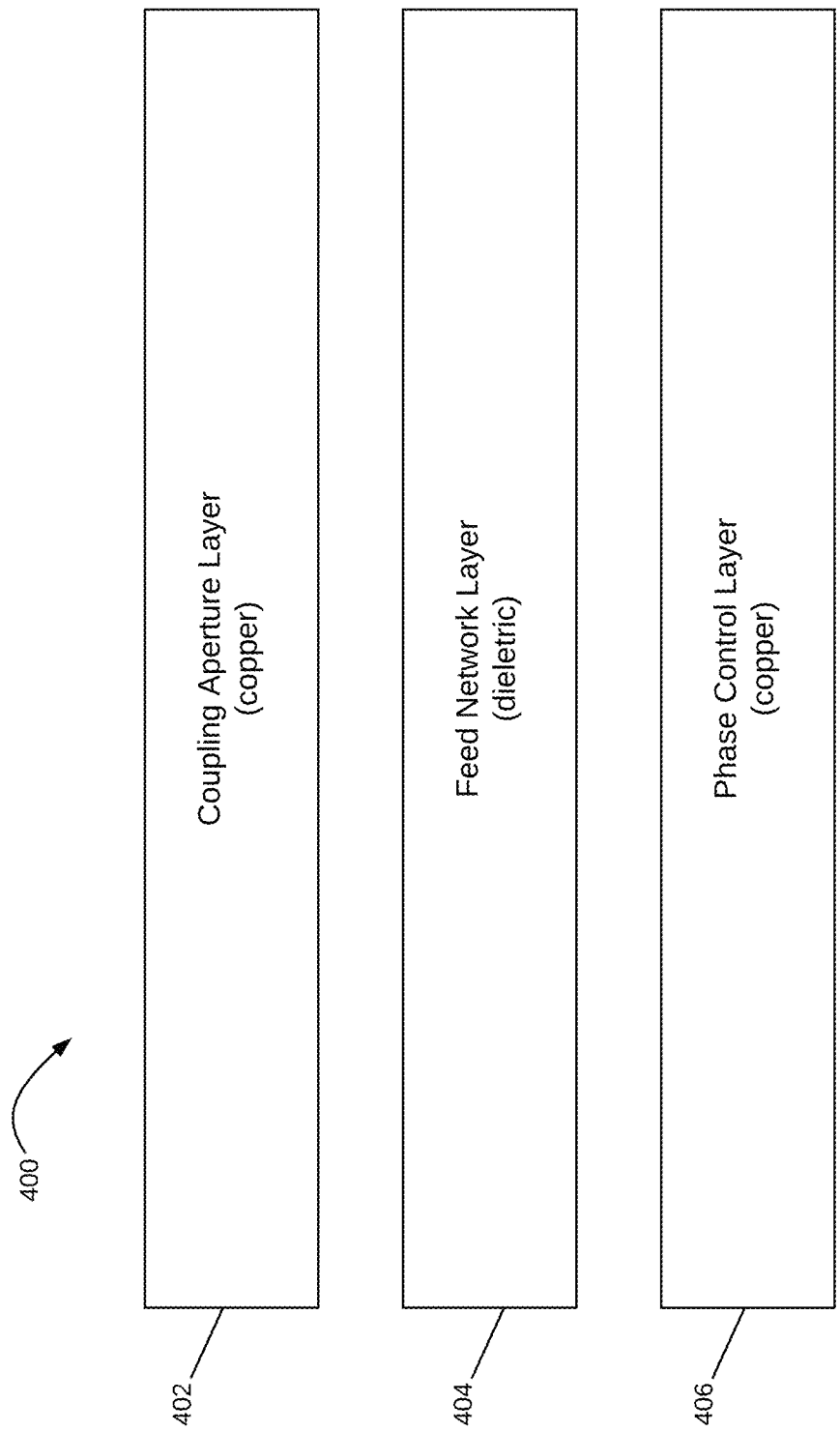
FIG. 4 illustrates a power division layer for use with an analog beamforming antenna array in accordance with some implementations of the subject technology.

FIG. 4 illustrates a power division layer for use with an analog beamforming antenna array in accordance with some implementations of the subject technology. In some implementations, the power division layer 400 includes a coupling aperture layer 402, a feed network layer 404 and a phase control layer 406. In some implementations, the power division layer 400 includes a dielectric layer interposed between two conductive layers, where the coupling aperture layer 402 and the phase control layer 406 correspond to the two conductive layers and the feed network layer 404 corresponds to the dielectric layer. In this respect, the coupling aperture layer 402 is disposed on the feed network layer 404, and the feed network layer 404 is disposed on the phase control layer 406. In some aspects, the phase control layer 406 includes a metallic material, such as copper, and has a connector for connecting the transmitting signal to the analog beamforming antenna array and a plurality of phase control circuits for providing phase shifts in radiated RD signals. The coupling aperture layer 402 has a plurality of coupling apertures for effectively feeding signals from the feed network layer 404 into the superelements in the superelement antenna array layer (e.g., 308). Although FIG. 4 depicts two conductive layers and one dielectric layer, the number of conductive layers and dielectric layers may vary depending on implementation without departing from the scope of the present disclosure.

Figure 5:
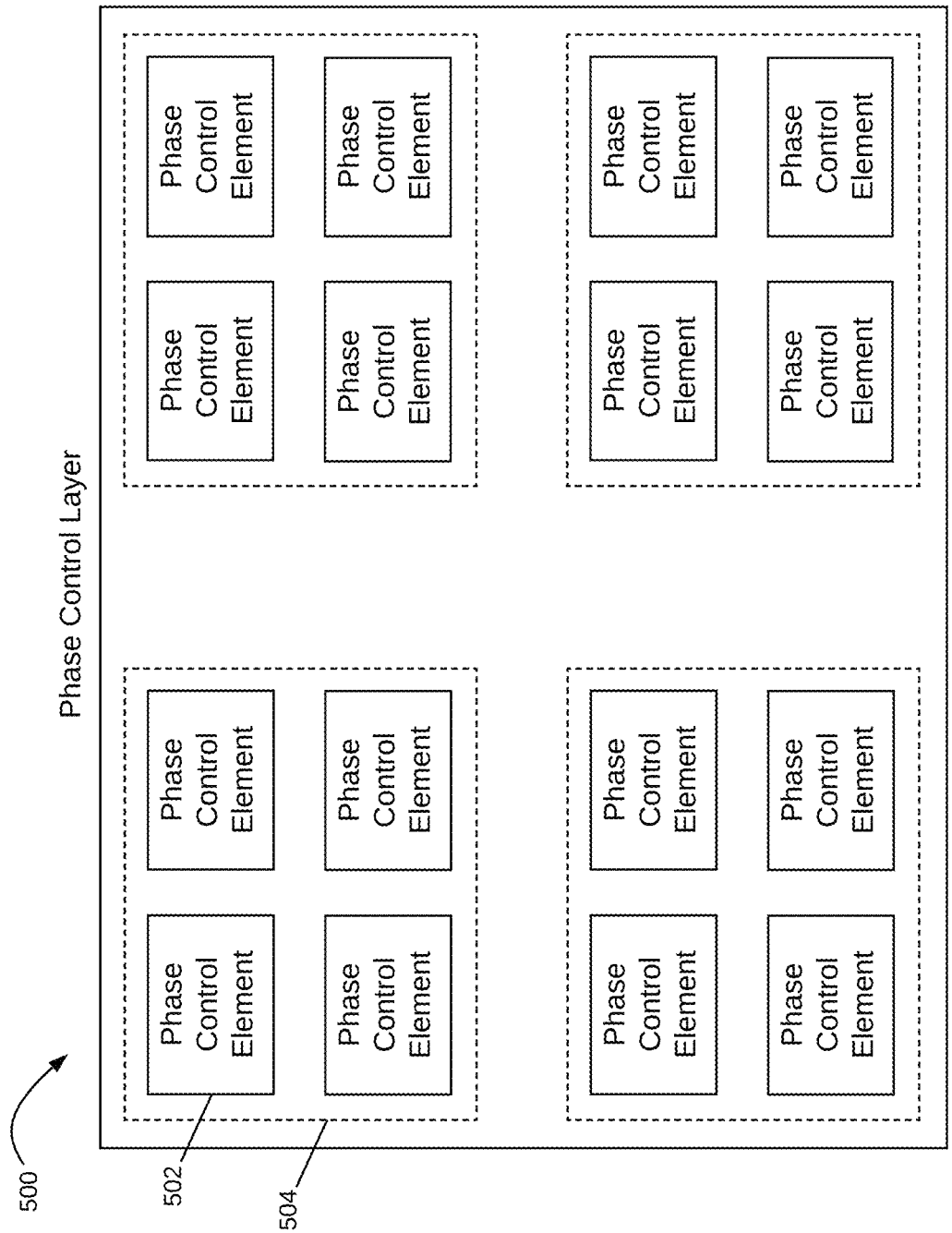
FIG. 5 illustrates a phase control layer for use in the power division layer of FIG. 4 in accordance with some implementations of the subject technology.

FIG. 5 conceptually illustrates a phase control layer 500 in accordance with some implementations of the subject technology. In some implementations, the phase control layer 500 is, or includes at least a portion of, the phase control layer 406 of FIG. 4. In some implementations, the phase control layer 500 includes multiple phase control elements, such as phase control element 502. In some implementations, each of the phase control elements is, or includes at least a portion of, a varactor, a set of varactors, a phase shift network, or any other phase control RFICs or mechanisms for applying phase shifts to radiated RF signals. In some implementations, the phase control layer 500 includes multiple groupings of phase control elements, such as group 504. In some aspects, each grouping includes a different subset of phase control elements. As depicted in FIG. 5, the phase control layer 500 has four groupings of phase control elements including group 504 that includes four phase control elements 502. The number of groupings and the number of phase control elements in each grouping can be a respective arbitrary number and can vary from those illustrated without departing from the scope of the present disclosure. In some aspects, each phase control element of each grouping can correspond to a superelement of a superelement array layer (e.g., the superelement antenna array layer 308), and each grouping of phase control elements can correspond to a section (or portion) of a feed network layer (e.g., the feed network layer 404). For example, each phase control element may be coupled to a different transmission line of a same level as that of other transmission lines coupled to other phase control elements.

Figure 6:
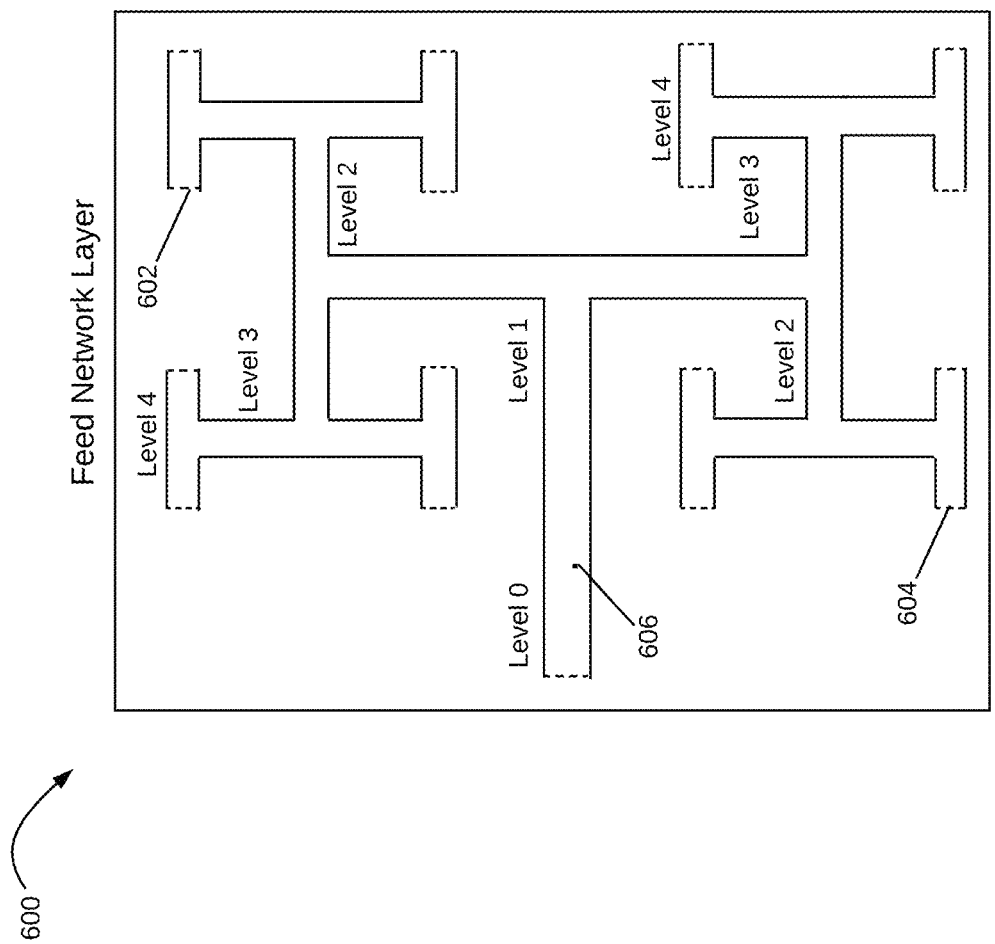
FIG. 6 illustrates a feed network layer for use in the power division layer of FIG. 4 in accordance with some implementations of the subject technology.

FIG. 6 illustrates a feed network layer 600 for use in the power division layer 400 of FIG. 4 in accordance with some implementations of the subject technology. The feed network layer 600 provides a corporate feed dividing the transmission signal received from a transmission signal controller (e.g., transmission signal controller 210 of FIG. 2) for propagation to a superelement antenna array layer (e.g., the superelement antenna array layer 220). In the illustrated example, the feed network layer 600 is a type of a power divider circuit such that it takes an input signal and divides it through a network of paths or transmission lines.

Within the feed network layer 600 is a network of paths, in which each of the division points is identified according to a division level. As depicted in FIG. 6, the feed network layer 600 includes a first level of transmission lines (depicted as LEVEL 0), a second level of transmission lines (depicted as LEVEL 1), a third level of transmission lines (depicted as LEVEL 2), a fourth level of transmission lines (depicted as LEVEL 3), and a fifth level of transmission lines (depicted as LEVEL 4). Each level in the feed network layer 600 doubles its paths: LEVEL 1 has 2 paths, LEVEL 2 has 4 paths, LEVEL 3 has 8 paths, and LEVEL 4 has 16 paths. The distance between two paths originating from a common division point may be fixed for other paths on a same level, but the distance between paths on other levels may be different. In this implementation, the paths have similar dimensions; however, the size of the paths may be configured differently to achieve a desired transmission and/or radiation result. The transmission lines of the feed network layer 600 may reside in a substrate of an analog beamforming antenna array (e.g., 202, 300).

In some implementations, the feed network layer 600 is impedance-matched, such that the impedances at each end of a transmission line matches the characteristic impedance of the line. Each transmission line may be bounded by a set of vias, such as vias 602 and 604. In some implementations, matching vias, e.g., via 606 are also provided for better impedance matching and phase control.

Figure 7:
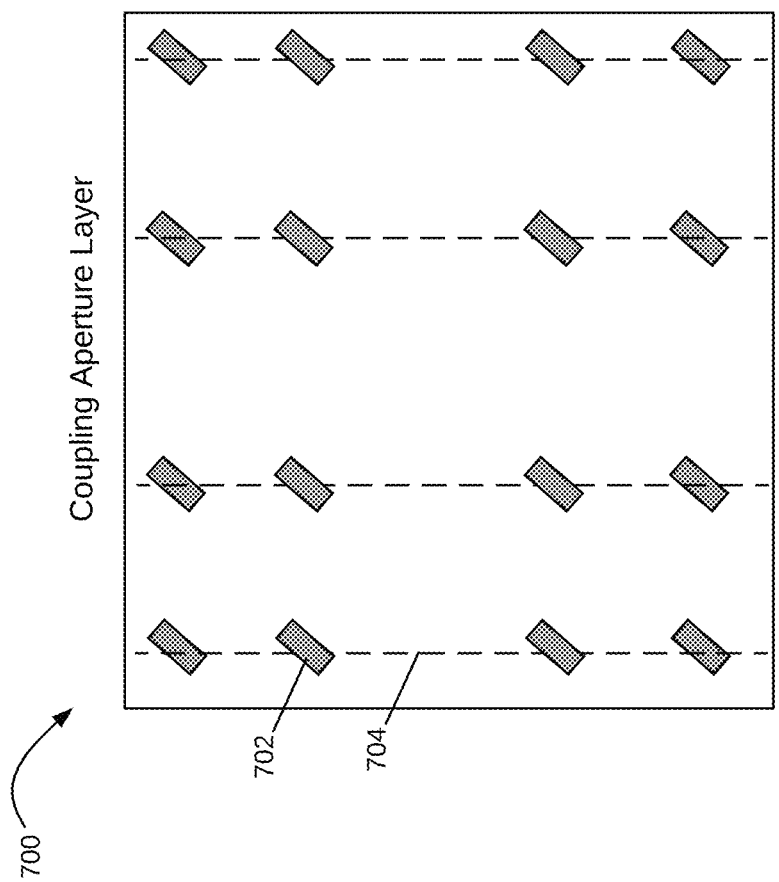
FIG. 7 illustrates a coupling aperture layer for use in the power division layer of FIG. 4 in accordance with some implementations of the subject technology.

FIG. 7 illustrates a coupling aperture layer 700 in accordance with some implementations of the subject technology. In some implementations, the coupling aperture layer 700 is, or includes at least a portion of, the coupling aperture layer 402 of FIG. 4. The coupling aperture layer 700 includes multiple apertures, such as coupling aperture 702, for coupling the transmission signals from a feed network layer (e.g., the feed network layer 404 of FIG. 4) to the superelements in a superelement antenna array of an analog beamforming antenna (e.g., the superelement antenna array 220 of the analog beamforming antenna 202 of FIG. 2). The coupling aperture layer 700 is a conductive layer that includes the coupling apertures 702 oriented at a non-orthogonal angle (e.g., 45°) about a centerline 704. The coupling aperture layer 700 includes multiple coupling apertures 702 that are arranged along the centerline 704. Each of the coupling apertures 702 can provide a transmission signal to corresponding radiating slots in the superelements.

FIG. 8 illustrates a schematic diagram illustrating the multiple layers in a power division layer in accordance with some implementations of the subject technology. As depicted in FIG. 8, the power division layer includes a phase control layer 800, a feed network layer 802, and a coupling aperture layer 804. The phase control layer 800 (similar to phase control layer 500 of FIG. 5) may include vias and openings for inserting a connector (not shown) to a Printed Circuit Board (PCB) for the analog beamforming antenna. The connector couples the transmission signal from the transmission signal controller 210 to the PCB for transmission through the feed network layer 802 and the coupling aperture layer 804. The phase control layer 800 also includes a set of phase control elements (PCEs), such as PCE 806, for applying phase shifts to radiated RF signals. The feed network layer 802 includes a corporate feed 808 for dividing up the transmission signal while achieving impedance matching. In some aspects, the corporate feed 808 includes a set of termination vias for coupling into the coupling aperture layer 804. The coupling aperture layer 804 includes a set of coupling slots (or apertures) oriented at a predetermined angle (e.g., 45°) as shown.

Figure 9:
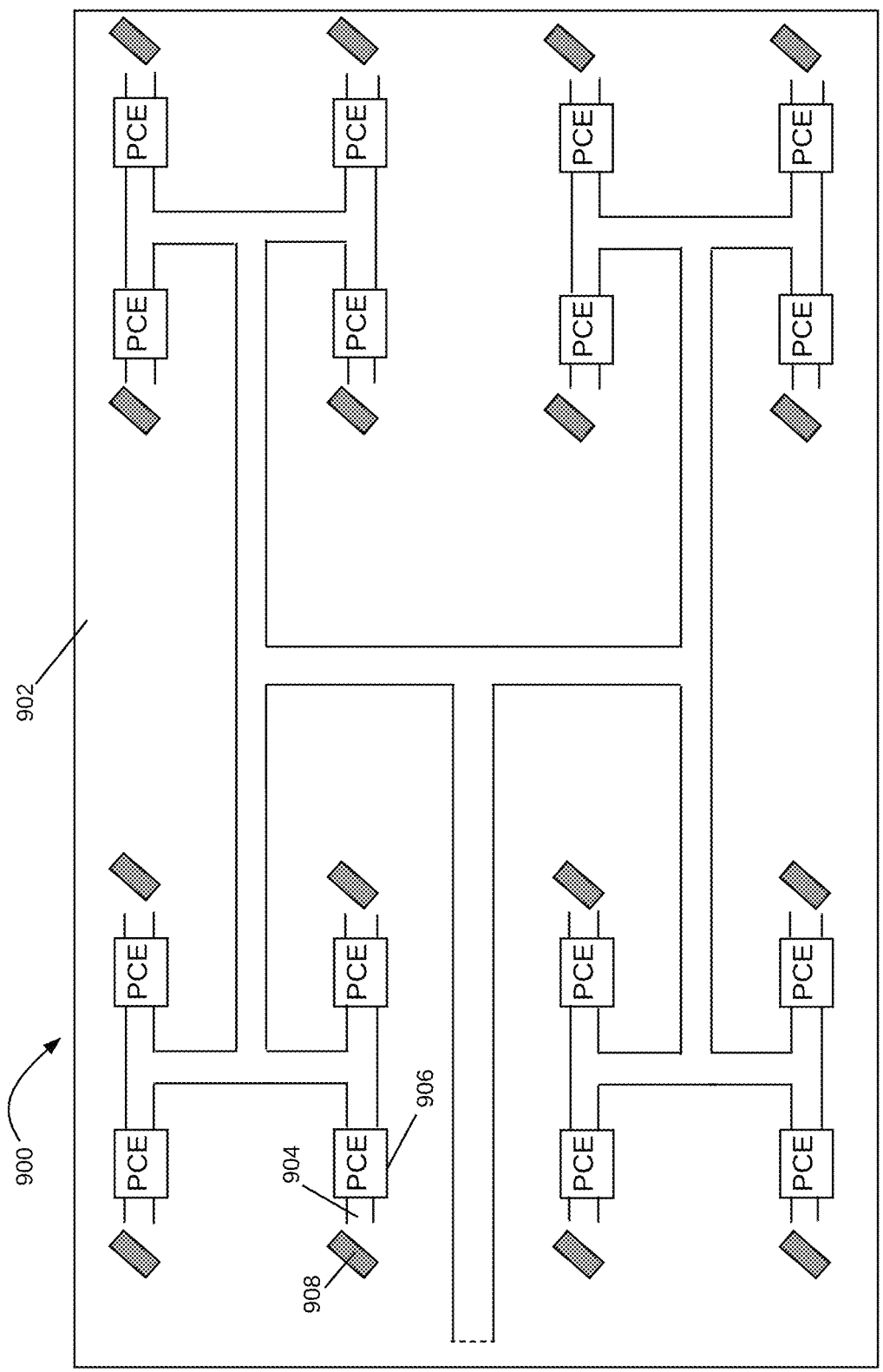
FIG. 9 illustrates a top view of the power division layer with the multiple layers of FIG. 8 in accordance with some implementations of the subject technology.

FIG. 9 illustrates a top view of a power division layer 900 with the multiple layers of FIG. 8 in accordance with some implementations of the subject technology. The power division layer 900 includes a substrate 902. In some implementations, the substrate 902 includes a ceramic-filled Polytetrafluoroethylene (PTFE) composite material. The PTFE composite material can exhibit thermal and phase stability across temperature and is used in automotive radar and microwave applications. In some aspects, the substrate 902 having the PTFE composite material with specific parameters, such as low dielectric loss, can be applicable to high frequency circuits. The power division layer includes a phase control layer (e.g., 800), a feed network layer (e.g., 802), and a coupling aperture layer (e.g., 804).

As depicted in FIG. 9, the phase control layer, the feed network layer, and the coupling aperture layer are superimposed over the substrate 902 to show the spatial relation between the layers for purposes of explanation herein. In some aspects, the phase control layer is disposed on the substrate 902, the feed network layer is disposed on the phase control layer, and the coupling aperture layer is disposed on the feed network layer. The phase control layer includes PCEs, such as PCE 906, that are individually arranged on a respective transmission line path in the corporate feed network of the feed network layer. The coupling aperture layer includes coupling apertures, such as coupling aperture 908, that are arranged in a non-orthogonal angle relative to respective transmission line paths of the feed network layer. The coupling apertures may be positioned proximate to distal ends of LEVEL 4 transmission line paths, such as end 904. In some aspects, each end of a LEVEL 4 transmission line path in the feed network layer leads to a coupling aperture through a PCE, such as end 904 to coupling aperture 908 through PCE 906. Although FIG. 9 depicts 16 PCEs and 16 coupling apertures corresponding to 16 transmission lines at a fourth level of transmission lines in the feed network layer of, the number of transmission lines levels, the number of coupling apertures and the number of PCEs may correspondingly vary from the number illustrated without departing from the scope of the present disclosure.

Figure 10:
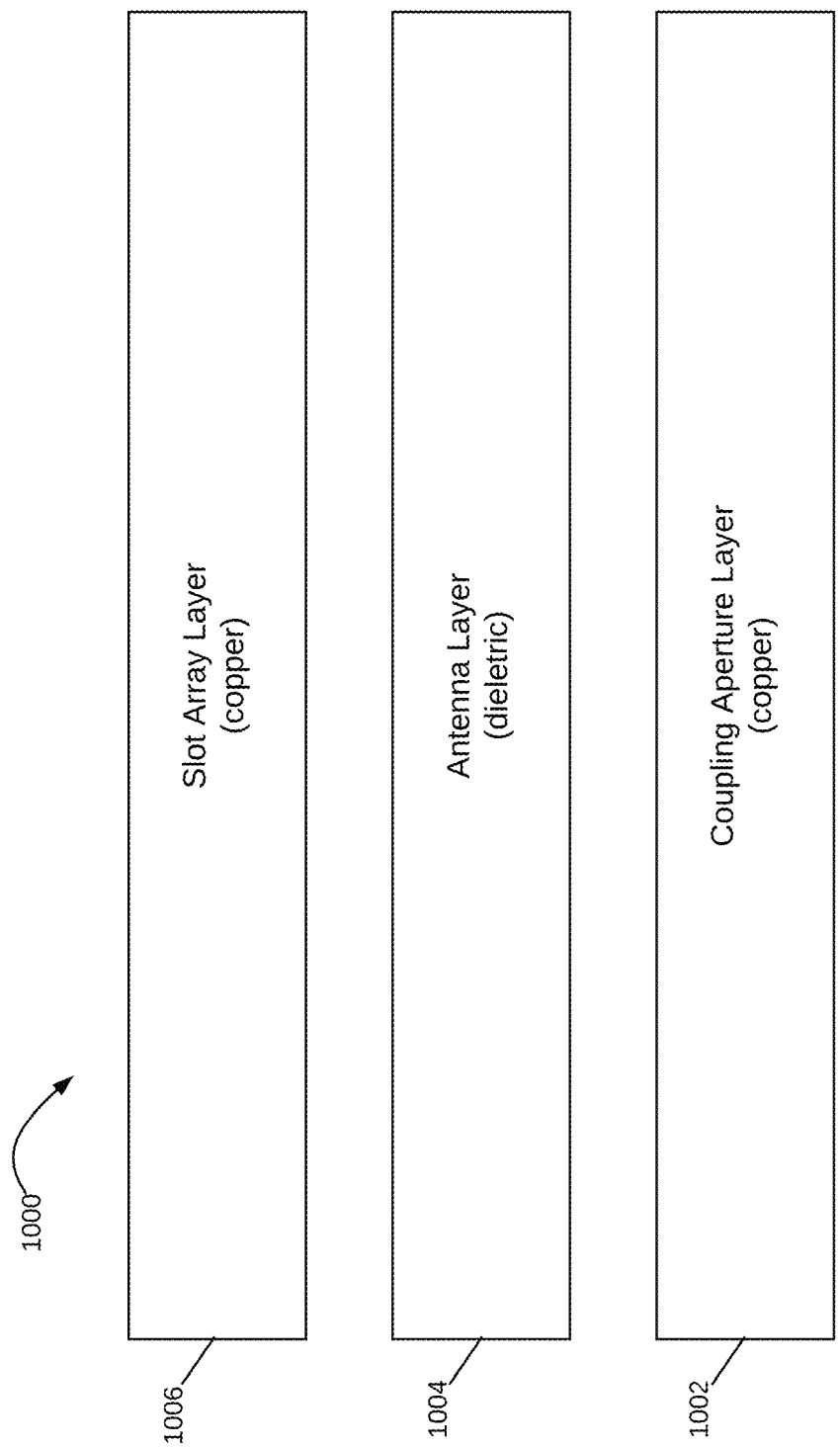
FIG. 10 illustrates a superelement antenna array layer for use with an analog beamforming antenna array in accordance with some implementations of the subject technology.

FIG. 10 illustrates a superelement antenna array layer for use with an analog beamforming antenna array in accordance with some implementations of the subject technology. In some implementations, the superelement antenna array layer 1000 includes a coupling aperture layer 1002, an antenna layer 1004 and a slot array layer 1006. In some implementations, the superelement antenna array layer 1000 includes a dielectric layer interposed between two conductive layers, where the coupling aperture layer 1002 and the slot array layer 1006 correspond to the two conductive layers and the antenna layer 1004 corresponds to the dielectric layer. In this respect, the slot array layer 1006 is disposed on the antenna layer 1004, and the antenna layer 1004 is disposed on the coupling aperture layer 1002. In some aspects, each of the coupling aperture layer 1002 and the slot array layer 1006 includes a metallic material, such as copper. The coupling aperture layer 1002 is similar to the coupling aperture layer 402 of FIG. 4 and the coupling aperture layer 700 of FIG. 7. The antenna layer 1004 includes a dielectric material and has an array of transmission lines as will be described in further detail in FIG. 10. The slot array layer 1006 includes an array of slots as will be described in further detail in FIG. 12. The array of transmission lines in the antenna layer 1004 in conjunction with the array of slots in the slot array layer 1006 can form an array of superelements. Each superelement in the array of superelements can provide RF signals at a predetermined phase.

Figure 11:
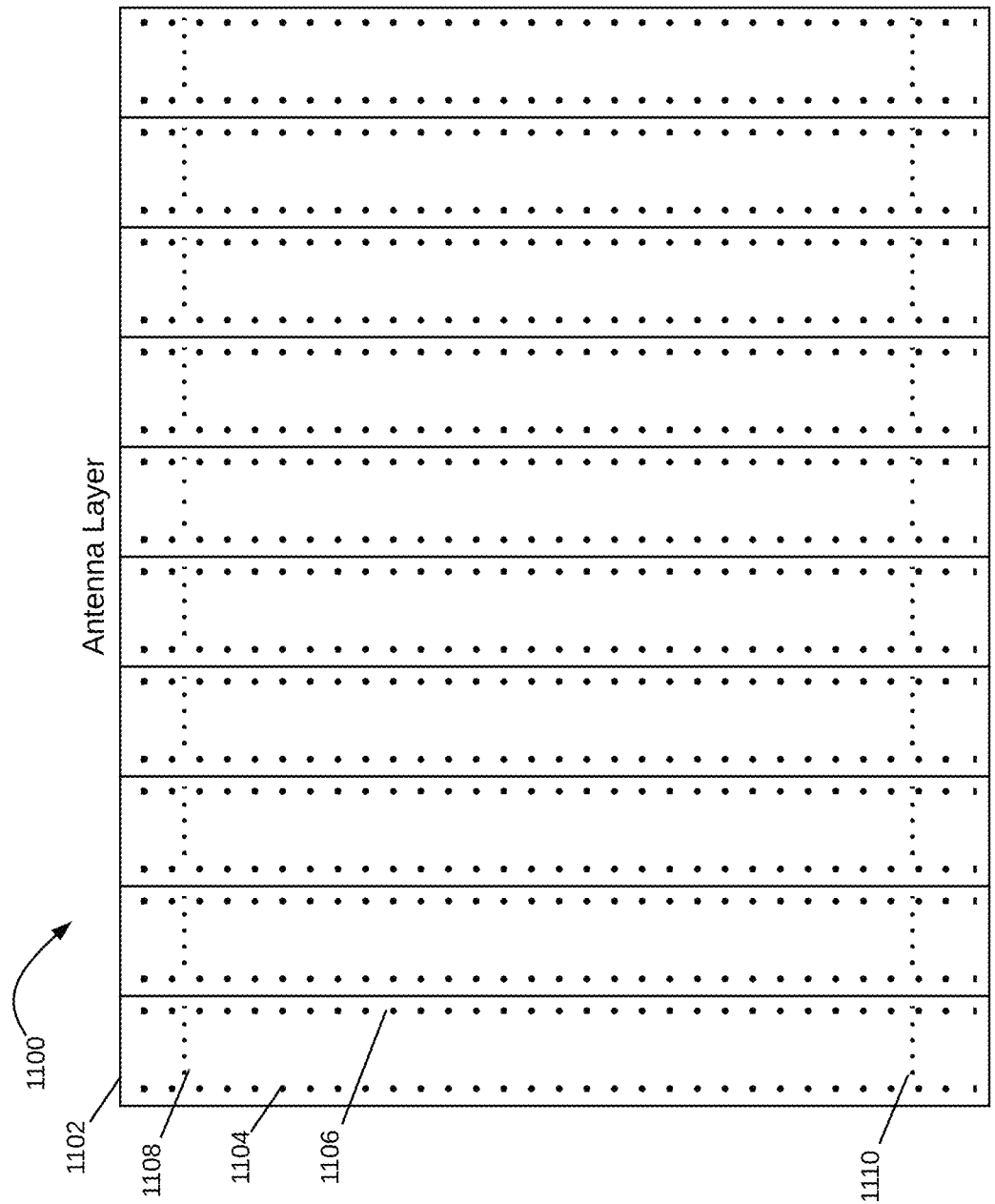
FIG. 11 illustrates an antenna layer for use with the superelement antenna array layer of FIG. 10 in accordance with some implementations of the subject technology.

FIG. 11 illustrates an antenna layer 1100 for use with the superelement antenna array layer 1000 of FIG. 10 in accordance with some implementations of the subject technology. The antenna layer 1100 is depicted with an array of transmission lines, where the antenna layer 1100 is segmented into multiple elements such that each element corresponds to a transmission line. In some implementations, each of the elements includes a set of parallel vias on opposing sides of element and a set of termination vias on opposing ends of the element. For example, the antenna layer 1100 includes element 1102 that includes a set of first vias 1104 arranged along a length of the element 1102 on a periphery of a first side of element 1102 and a set of first vias 1106 arranged in parallel to the set of first vias 1104 on a periphery of a second side of the element 1102. The element 1102 also includes a set of second vias 1108 arranged orthogonal to the set of first vias (e.g., 1104, 1106) and proximate to a first end of the element 1102, and a set of second vias 1110 arranged proximate to a second end of the element 1102, which serve as the termination vias.

There may be any number of elements in the antenna layer 1100 depending on implementation, such as 8, 16, 32 and so on. In some implementations, the antenna layer 1100, a feed network layer (e.g., 500) and a slot array layer (e.g., 906) have a corresponding number of elements. For example, if the feed network layer has 4 levels with 16 paths for 16 transmission signals, then the antenna layer 1100 can have 16 elements in its array of transmission lines to feed into 16 slot elements of the slot array layer. Although FIG. 11 depicts the antenna layer 1100 with a certain configuration and arrangement of elements and vias, the configuration and arrangement of such features can vary depending on implementation without departing from the scope of the present disclosure.

Figure 12:
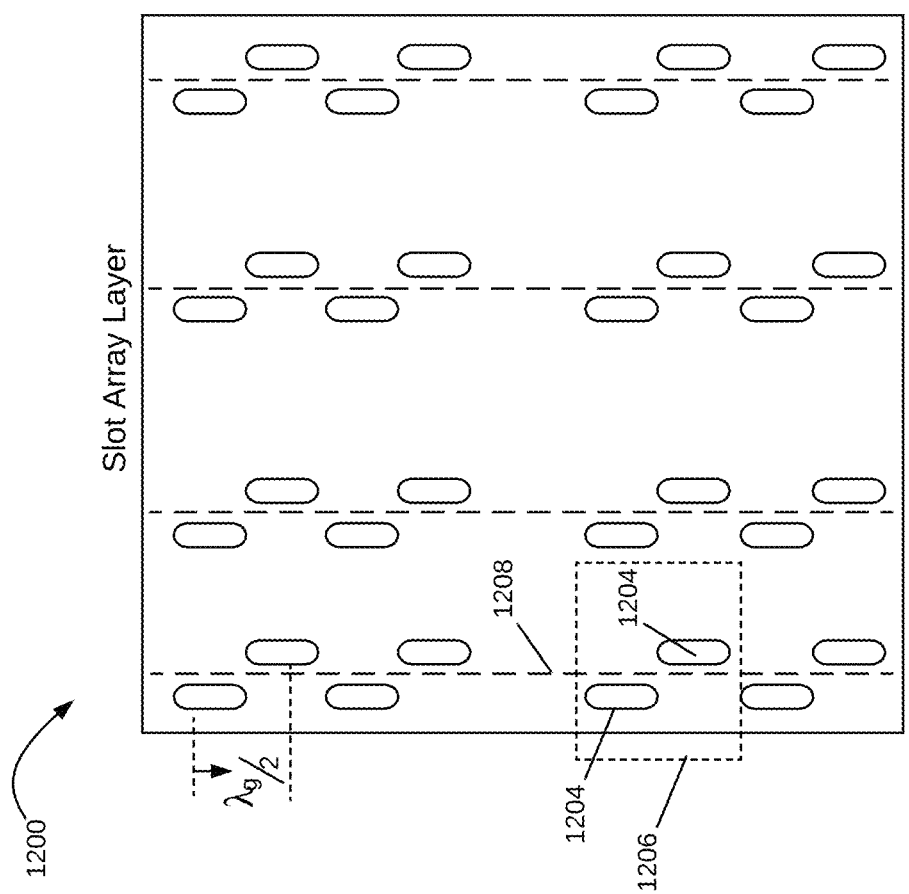
FIG. 12 illustrates a slot array layer for use with the superelement antenna array layer of FIG. 10 in accordance with some implementations of the subject technology.

FIG. 12 illustrates a slot array layer 1200 for use with the superelement antenna array layer 1000 of FIG. 10 in accordance with some implementations of the subject technology. The slot array layer 1200 includes an array of elements, where each element of the array of elements has multiple slots (or openings) penetrating through the slot array layer 1200 along a top surface of the slot array layer 1200. In some implementations, the slots in each element are equidistant to a center line 1208 (depicted as a dashed line) and are staggered from other slots across the center line along a length of the element.

Each element in the slot array layer 1200 together with a corresponding element in the antenna layer 1100 of FIG. 11 can form a superelement. In some implementations, the superelements represent waveguides, which may be bounded by conductive vias along the periphery of each side and by a ground at each (or either) opposing end of the layer. For example, the slot array layer 1200 includes an element 1206 having slots 1202 and 1204 that are equidistant from the center line 1208. The distance between the center of a first slot (e.g., slot 1202) in an element (e.g., 1206) of the slot array layer 1200 and the center of an adjacent equidistant slot (e.g., 1204) is depicted as $\lambda_g/2$, where $\lambda_g$ is the guide wavelength. In some examples, the slot array layer 1200 has a 16×2 configuration, where the slot array layer 1200 includes 16 elements with 2 slots in each element. However, the number of elements and the number of slots may vary from the number illustrated without departing from the scope of the present disclosure.

FIG. 13 illustrates a schematic diagram illustrating the multiple layers in a superelement antenna array layer in accordance with some implementations of the subject technology. As depicted in FIG. 13, the superelement antenna array layer includes a coupling aperture layer (e.g., 1300), an antenna layer (e.g., 1302) and a slot array layer (e.g., 1304). The coupling aperture layer 1300 includes multiple sets of coupling apertures penetrating through the coupling aperture layer 1300, where each set of coupling apertures is oriented at a predetermined angle (e.g., 45°) as shown. The antenna layer 1302 is depicted with an array of transmission lines, where the antenna layer 1302 is segmented into multiple elements such that each element corresponds to a transmission line. In some implementations, each of the elements includes a set of parallel vias on opposing sides of the element and a set of termination vias on opposing ends of the element. The slot array layer 1304 includes an array of elements, where each element of the array of elements has multiple slots (or openings) penetrating through the slot array layer 1304 along a top surface of the slot array layer 1304. In some implementations, the slots in each element are equidistant to a center line and are staggered from other slots across the center line along a length of the element.

Figure 14:
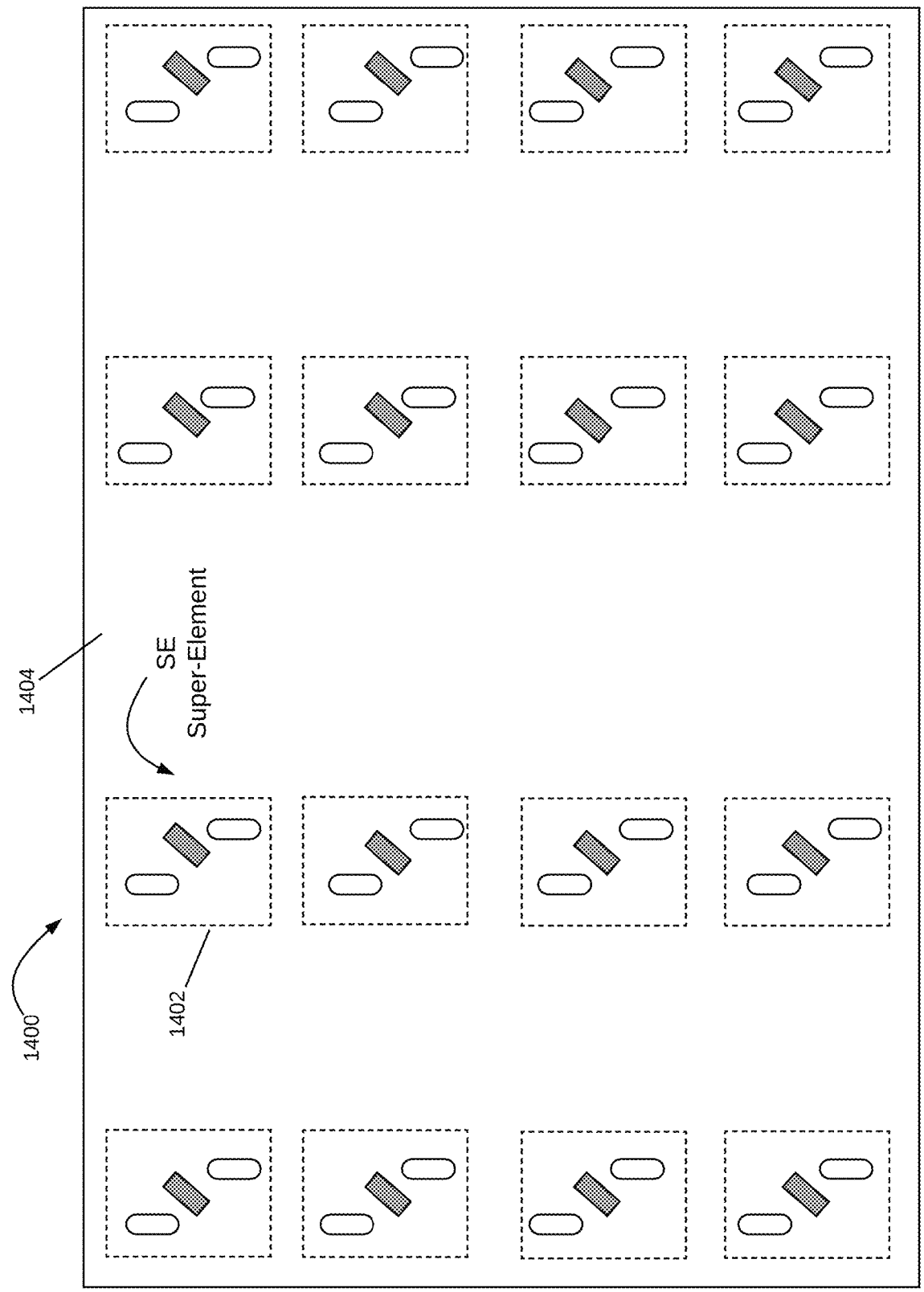
FIG. 14 conceptually illustrates a top view of the multiple layers of the superelement antenna array layer of FIG. 10 in accordance with some implementations of the subject technology.

FIG. 14 conceptually illustrates a top view of the multiple layers of a superelement antenna array layer 1400 in accordance with some implementations of the subject technology. The superelement antenna array layer 1400 (similar to the superelement antenna array layer 1000 of FIG. 10) includes a coupling aperture layer (e.g., 1300), an antenna layer (e.g., 1302) and a slot array layer (e.g., 1304). As depicted in FIG. 14, the coupling aperture layer is superimposed over the slot array layer such that a coupling aperture is arranged between a pair of radiating slots to form a superelement, such as superelement 1402. For example, the radiating slots may be staggered from one another with the coupling aperture oriented at a predetermined non-orthogonal angle relative to the radiating slots. The superelement antenna array layer 1400 includes an array of superelements having superelements arranged laterally in multiple rows (or columns). Although FIG. 14 depicts 16 superelements, the number of superelements is arbitrary and may vary from the number illustrated without departing from the scope of the present disclosure.

Figure 15:
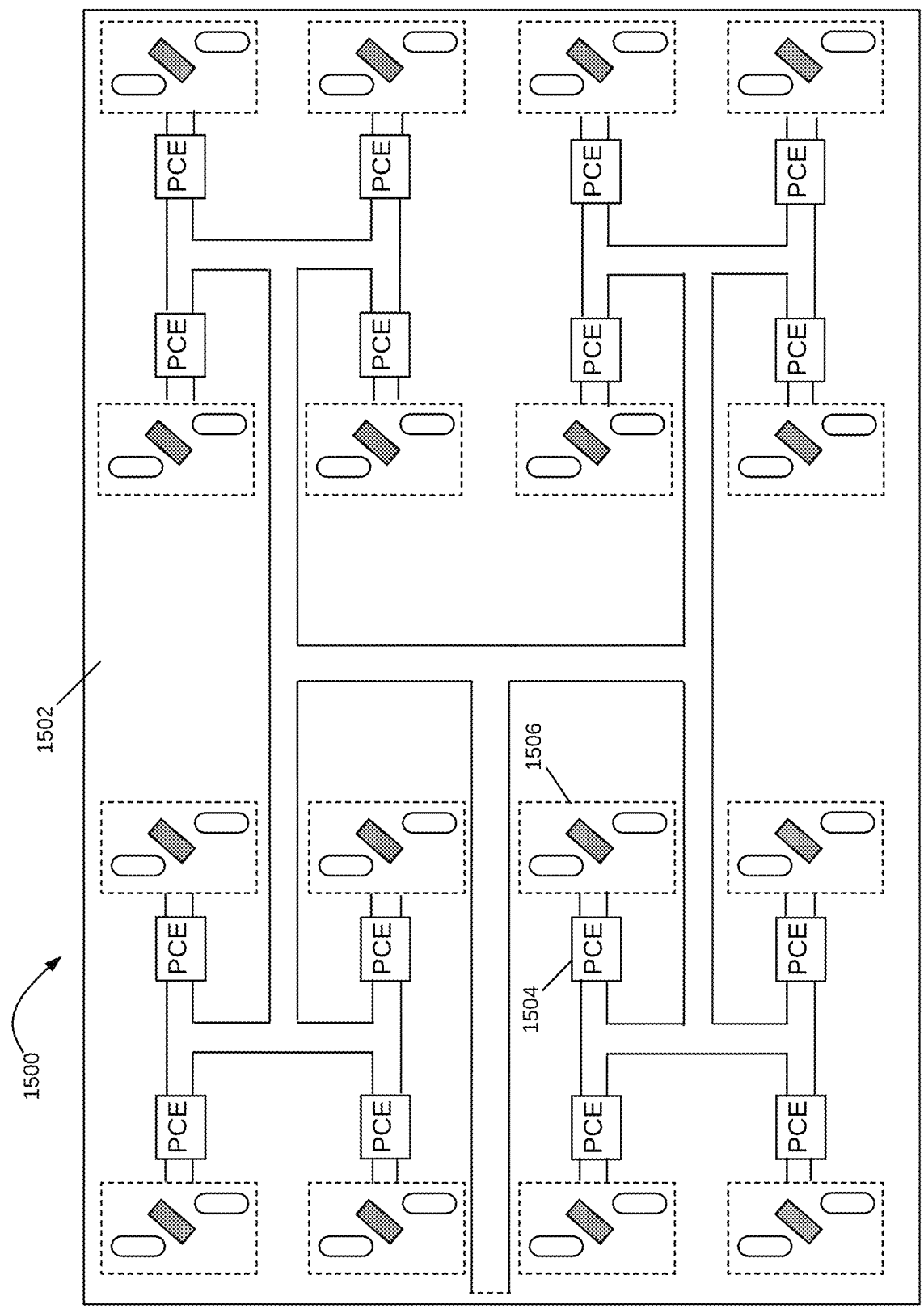
FIG. 15 conceptually illustrates a top view of an analog beamforming antenna with the multiple layers of FIGS. 8 and 13 in accordance with some implementations of the subject technology.

FIG. 15 conceptually illustrates a top view of an analog beamforming antenna 1500 with the multiple layers of FIGS. 8 and 13 in accordance with some implementations of the subject technology. The analog beamforming antenna 1500 is, or includes at least a portion of, the analog beamforming antenna array 202 of FIG. 2. In some implementations, the analog beamforming antenna 1500 includes a power division layer (e.g., 900 of FIG. 9), a superelement antenna array layer (e.g., 1400 of FIG. 14), and a superstrate layer (e.g., 224 of FIG. 2), where a first adhesive layer is interposed between the power division layer and the superelement antenna array layer, and a second adhesive layer is interposed between the superelement antenna array layer and the superstrate layer. As depicted in FIG. 15, the superelement antenna array layer is superimposed over the power division layer such that placement of the superelements (e.g., 1402 of FIG. 14) in the superelement antenna array layer relative to the corporate feed network (e.g., 802 of FIG. 8) in the power division layer is visible for purposes of explanation herein.

The analog beamforming antenna 1500 includes a substrate 1502. In some implementations, the substrate 1502 includes a ceramic-filled Polytetrafluoroethylene (PTFE) composite material. The PTFE composite material can exhibit thermal and phase stability across temperature and is used in automotive radar and microwave applications. In some aspects, the substrate 1502 having the PTFE composite material with specific parameters, such as low dielectric loss, can be applicable to high frequency circuits. Each of the power division layer, the superelement antenna array layer, and the superstrate layer substrate, including the substrate 1502, can include a dielectric layer interposed between two conductive layers. Each conductive layer and dielectric layer can have a predetermined thickness (e.g., 20 mm). The adhesive layers may be around 1-3 mil thick.

As depicted in FIG. 15, the phase control layer, the feed network layer, and the coupling aperture layer are superimposed over the substrate 1502 to show the spatial relation between the layers. In some aspects, the phase control layer is disposed on the substrate 1502, the feed network layer is disposed on the phase control layer, and the coupling aperture layer is disposed on the feed network layer. The power division layer includes PCEs, such as PCE 1504, that are individually arranged on a respective transmission line path in the corporate feed network of the feed network layer. The superelement antenna array layer includes superelements, such as superelement 1506, that are arranged proximate to distal ends of LEVEL 4 transmission line paths. As depicted in FIG. 15, each PCE is coupled to a superelement through the feed network (e.g., PCE 1504 coupled to superelement 1506). The PCE provides a predetermined phase shift to an RF signal that is radiated out of the radiating slots of the superelement antenna array layer.

It is appreciated that the disclosed examples are a dramatic contrast to the traditional complex systems incorporating multiple antennas controlled by digital beam forming. The disclosed examples increase the speed and flexibility of conventional antenna systems, while reducing the footprint and expanding performance.

The radar system 100 of FIG. 1 may implement the various aspects, configurations, processes and modules described herein in the present disclosure. The radar system 100 is configured for placement in an autonomous driving system or in another structure in an environment (e.g., buildings, billboards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metamaterial antenna structures and Artificial Intelligence (AI) techniques to create a truly intelligent digital eye for autonomous vehicles.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item).The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An analog beamforming antenna for millimeter wave applications, comprising:
  a superelement antenna array layer comprising an array of superelements, wherein each superelement in the array of superelements includes a coupling aperture oriented at a predetermined non-orthogonal angle relative to a plurality of radiating slots for radiating a transmission signal;
  a power division layer configured to serve as a feed to the superelement antenna array layer, the power division layer comprising a plurality of phase control elements configured to apply different phase shifts to transmission signals propagating to the superelement antenna array layer; and
  a top layer disposed on the superelement antenna array layer.

2. The analog beamforming antenna of claim 1, wherein the power division layer includes a coupling aperture layer, a feed network layer and a phase control layer, wherein the coupling aperture layer and the phase control layer respectively correspond to two conductive layers of the plurality of conductive layers and the feed network layer corresponds to a dielectric layer.

3. The analog beamforming antenna of claim 2, wherein the phase control layer is disposed on a substrate of the analog beamforming antenna, the feed network layer is disposed on the phase control layer, and the coupling aperture layer is disposed on the feed network layer.

4. The analog beamforming antenna of claim 3, wherein each end of a transmission line in the feed network layer is coupled to a coupling aperture in the coupling aperture layer through respective ones of the plurality of phase control elements.

5. The analog beamforming antenna of claim 1, wherein each of the plurality of phase control elements provides a predetermined phase shift to a radio frequency signal that is radiated out of at least one of the plurality of radiating slots of the superelement antenna array layer.

6. The analog beamforming antenna of claim 1, wherein each of the plurality of phase control elements includes a radio frequency integrated circuit having one or more of a varactor, a network of varactors, or a phase shift network to apply the different phase shifts in a range of 0 degrees to 360 degrees.

7. The analog beamforming antenna of claim 1, wherein:
the power division layer comprises a corporate feed structure having a plurality of transmission lines that enables the signal to be transmitted to the array of superelements in the superelement antenna array layer,
the top layer comprises a metamaterial (MTM) array layer that includes a plurality of MTM cells, wherein the MTM array layer is configured to provide reactance control within the plurality of MTM cells, and
the MTM array layer comprises one or more reactance control devices embedded on each MTM cell of the plurality of MTM cells.

8. The analog beamforming antenna of claim 7, wherein the analog beamforming antenna is configured to enable reactance control through the plurality of phase control elements in the power division layer and through the one or more reactance control devices in each MTM cell of the plurality of MTM cells.

9. The analog beamforming antenna of claim 1, further comprising:
one or more adhesive layers coupled to the superelement antenna array layer and the power division layer, wherein the one or more adhesive layers comprise an adhesive material that enables the superelement antenna array layer to be adhered to the power division layer, and wherein the one or more adhesive layers include pre-impregnated bonding sheets.

10. The analog beamforming antenna of claim 1, wherein the top layer comprises a superstrate layer, and wherein the superstrate layer is configured to increase efficiency and directivity of the analog beamforming antenna.

11. A radar system for use in an autonomous driving vehicle, comprising:
an antenna module configured to radiate a transmission signal with an analog beamforming antenna in a plurality of directions and to generate radar data capturing a surrounding environment,
wherein the analog beamforming antenna comprises a superelement antenna array layer, a power division layer, and a top layer disposed on the superelement antenna array layer,
wherein the power division layer is configured to serve as a feed to the superelement antenna array layer, and
wherein the power division layer comprises a plurality of phase control elements configured to apply different phase shifts to the transmission signal propagating to the superelement antenna array layer.

12. The radar system of claim 11, wherein the superelement antenna array layer comprises an array of superelements, wherein each superelement in the array of superelements includes a coupling aperture oriented at a predetermined non-orthogonal angle relative to a plurality of radiating slots for radiating one or more transmission signals.

13. The radar system of claim 11, wherein the power division layer includes a coupling aperture layer, a feed network layer and a phase control layer, wherein the coupling aperture layer and the phase control layer respectively correspond to two conductive layers of the plurality of conductive layers and the feed network layer corresponds to a dielectric layer, and wherein the coupling aperture layer is disposed on the feed network layer and the feed network layer is disposed on the phase control layer.

14. The radar system of claim 13, wherein the phase control layer comprises the plurality of phase control elements coupled to the feed network layer and configured to generate a plurality of phase shifts and apply at least one of the plurality of phase shifts to a transmission line in the feed network layer.

15. The radar system of claim 13, wherein the plurality of phase control elements includes a plurality of groupings of phase control elements, wherein each grouping of the plurality of groupings includes a different subset of phase control elements of the plurality of phase control elements.

16. The radar system of claim 15, wherein each phase control element of each grouping of the plurality of groupings is coupled to a different superelement of the superelement array layer.

17. The radar system of claim 16, wherein each phase control element of at least one of the plurality of groupings is coupled to a different transmission line that is on a same level in the feed network layer as that of other transmission lines coupled to other phase control elements of the grouping.

18. The radar system of claim 13, wherein the superelement antenna array layer includes a slot array layer that includes an array of elements, wherein each element of the array of elements includes a plurality of radiating slots penetrating through the slot array layer, and wherein a coupling aperture in the coupling aperture layer is positioned between a pair of radiating slots of the plurality of radiating slots to form a superelement based at least on the coupling aperture layer being superimposed over at least a portion of the slot array layer.

19. A power division layer for use in an analog beamforming antenna for millimeter wave applications, comprising:
a feed network layer comprising a plurality of transmission lines;
a phase control layer comprising a plurality of phase control elements coupled to the feed network layer and configured to generate a plurality of phase shifts and to apply at least one of the plurality of phase shifts to a radio frequency signal propagating to a superelement antenna array layer of the analog beamforming antenna, wherein each phase control element of the plurality of phase control elements is coupled to a different transmission line of the plurality of transmission lines that is on a same level in the feed network layer as that of other transmission lines coupled to other phase control elements of the plurality of phase control elements; and a coupling aperture layer comprising a plurality of coupling apertures that enable radiating a transmission signal, wherein each end of the plurality of transmission lines in the feed network layer is coupled to one of the plurality of coupling apertures through respective ones of the plurality of phase control elements.

20. The power division layer of claim 19, wherein the plurality of phase control elements includes a plurality of groupings of phase control elements, wherein each grouping includes a different subset of phase control elements of the plurality of phase control elements, and wherein each phase control element of each grouping of the plurality of groupings is coupled to a different superelement of the superelement array layer.

\* \* \* \* \*